United States Patent [19]

Harada et al.

[11] Patent Number: 5,019,160

[45] Date of Patent: May 28, 1991

[54] METHOD OF MODIFYING STEEL SLAG

[75] Inventors: Mitsuhisa Harada; Masao Tomari, both of Kitakyushu, Japan

[73] Assignee: Nippon Jiryoku Senko Co., Ltd., Kitakyushu, Japan

[21] Appl. No.: 493,650

[22] Filed: Mar. 15, 1990

Related U.S. Application Data

[63] Continuation-in-part of Ser. No. 400,914, Sep. 30, 1989.

[51] Int. Cl.$^5$ ............................................... C21B 5/04
[52] U.S. Cl. ........................................................ 75/564
[58] Field of Search ........................................... 75/564

[56] References Cited

U.S. PATENT DOCUMENTS

| | | | |
|---|---|---|---|
| 3,591,367 | 7/1971 | Perfect | 75/567 |
| 3,827,880 | 8/1974 | Greeson | 75/307 |
| 4,342,590 | 8/1982 | Luyckx | 75/567 |
| 4,655,831 | 4/1987 | Ishizaka | 75/564 |

*Primary Examiner*—Peter D. Rosenberg
*Attorney, Agent, or Firm*—Armstrong, Nikaido, Marmelstein, Kubovcik & Murray

[57] ABSTRACT

Method of producing steel slag free from disintegration completed through the modification of slag in molten state by use of a small amount of modifier while increasing the temperature of slag, wherein the chemical composition of the steel slag and modifier to be charged is analyzed beforehand, a small amount of boron-containing compounds and the first modifier consisting of silicate-containing minerals, etc. by which the basicity of the steel slag after treated settles in the range between 1.6 and 1.9 are mixed to the slag and, further, the exothermic and powdery second modifier consisting of one or two and more among aluminum, aluminum dross, magnesium, and magnesium slag is charged together with agitating gas by bubbling.

4 Claims, No Drawings

METHOD OF MODIFYING STEEL SLAG

This is a Continuation-In-Part application of U.S. Ser. No. 400,914 filed Aug. 30, 1989.

BACKGROUND OF THE INVENTION

The present invention relates to a method of modifying steel slag including free lime (F.CaO), free magnesia (F.MgO), and dicalcium silicate (Y-2CaO.SiO$_2$), and having a liability to raise expansion and disintegration.

Steel slag in molten state, if being cooled as it is, is difficult to dispose and offers no usage other than for fertilizer, because it includes free lime, free magnesia, and Y-2CaO.SiO$_2$ and has a nature of expansion and disintegration.

As the method of treating steel slag described above, it has known to modify such steel slag into stable minerals such as 2CaO.Al$_2$O$_3$.SiO$_2$ or 2CaO.MgO.2SiO$_2$ by charging it with silicate-containing minerals or red mud as a modifier as described in U.S. Pat. Nos. 4,711,662 and 4,179,279.

In the method described above, however, there has been a problem that a sufficient modifying reaction is difficult to obtain, because a large amount of modifier consisting of silicate-containing minerals and red mud is charged and does not mix sufficiently with steel slag and, moreover, it absorbs the heat and lowers the temperature of the steel slag.

To solve the problem described above, there has known a method of modifying molten steel slag containing mainly dicalcium silicate by adding boron-containing minerals so as to prevent the powdering of slag in cooling as laid open in U.S. Pat. No. 4,655,831 which is characterized by the addition of above-said boron-containing minerals whose crystal water content is adjusted to 4 to 12% by weight.

Though above-said method is effective to the steel slag containing dicalcium silicate as its major component, there still has been a problem that the method of only adding above-said boron-containing minerals is not effective to the slag in reducing process in electric furnace, the slags such as those produced from continuous casting, etc., and containing free lime and free magnesia in addition to above-said dicalcium silicate, and even the steel slag produced from stainless steel making process if it contains free lime and free magnesia in addition to dicalcium silicate, and the slag after treated still has a nature of expansion and disintegration, and the slag containing heavy metal such as Cr may allow the elusion of Cr$^{6+}$ ion therefrom.

As the method to solve these problems, it is known as effective to add silicate-containing minerals further and, as the arts relating to this aspect, there are methods of modifying steel slag published in Japanese Patent laid open Nos. 62-162,657, and 62-87,442.

In Japanese Patent laid open No. 62-162,657, there is proposed a method of modifying steel slag characterized by the modification of steel slag through a fusing reaction raised by adding to the steel slag in molten state with boric acid or boron-containing compounds by the amount by which the content of B$_2$O$_3$ in the slag becomes 0.1 to 0.3% by weight, and one or two and more of modifiers among silicate-containing stones and minerals and their weatherings, regulus, coal ash, glass chips, and foundry waste sand by the amount corresponding to 3 to 5% by weight of the slag. And, as the silicate-containing stones and minerals, it is disclosed to use one or two among obsidian, perlite, liparite, expansive shale, etc.

In above-said method, however, there has been a problem that a smooth reaction is not obtained if the temperature of steel slag in molten state is low.

In Japanese Patent laid open No. 62-87,442, there is proposed a method of modifying steel slag characterized by adding to the steel slag in molten state with boric acid or boron-containing compounds, and at least one kind of modifier among silicate-containing stones and minerals and their weatherings, slag, coal ash, glass chips, and at least one kind of exothermic substance among Al, Si, bark, coal, carbonaceous shale, pulp chips, sawdust, corrugated cardboard, and wastes of packing material.

And, in this method, it is also proposed that above-said exothermic substance is spread into a ladle or put on the bottom of ladle in place of laying slag.

In this case, however, there has been a problem that the exothermic substance does not mix sufficiently with the steel slag and, accordingly, sufficient modifying reaction may not be obtained if the temperature of steel slag is low, and if the exothermic substance is charged by above-said method.

Further, in the conventional method described above, because the basicity (CaO/SiO$_2$) of slag is not considered in the treatment, there has been a problem that the total amount of CaO becomes large to make the fluidity of slag poor due to its too high basicity even if the specified amount of silicate-containing minerals, etc. is charged and, even if the exothermic substance is charged through bubbling, it does not mix well with the slag, and sufficient modifying reaction may not be obtained.

SUMMARY OF THE INVENTION

The present invention has been made in view of above-described circumstances and, accordingly, it is an object of this invention to provide a method of modifying steel slag, wherein the steel slag with relatively low temperature can be modified by the addition of a small amount of modifier.

The method of modifying steel slag relating to this invention with the object mentioned above is a method to modify steel slag containing mainly free lime, free magnesia, and dicalcium silicate, comprising a step of mixing the steel slag in molten state with boron-containing compounds by the amount corresponding to 0.1 to 0.4% by weight of said steel slag as a conversion value into B$_2$O$_3$ and with the first modifier consisting of one or two and more among silicate-containing stones and minerals and their weatherings, coal ash, and foundry waste sand, and a step of mixing the exothermic second modifier consisting of one or two and more among aluminum, aluminum dross, magnesium, and magnesium slag; wherein the amount of charging above-said first modifier is so adjusted that the basicity of the steel slag after treated may settle in the range between 1.6 and 1.9 by analyzing beforehand the chemical composition of above-said steel slag and above-said first modifier to be charged. And, above-said second modifier is ground into powder beforehand and charged into above-said molten steel slag together with agitating gas by bubbling.

Here, in above-said method, it is possible to modify above-said steel slag after dropping the melting point of the slag by mixing the melting-point dropping agent consisting of one or two and more among soda glass chips, copper regulus, zinc regulus in addition to above-said first modifier.

The basicity means $CaO/SiO_2$ ratio by weight in steel slag. And, the method of analyzing the composition of slag before treatment includes the method in which the composition is calculated from the raw material, and the method in which the composition is analyzed through an actual sampling of the slag.

Further, above-said boron-containing compounds mean the solid compounds (including minerals) containing 20% and more boron, in specific, they are boron oxide ($B_2O_3$), boric acid ($H_3BO_3$), borax ($Na_2B_4O_7.10H_2O$), kernite ($Na_2B_4O_7.4H_2O$), colemanite ($Ca_2B_6O_{11}.5H_2O$), ulexite ($Na_2Ca_2B_{10}O_{18}.16H_2O$), and artificial substance of borosilicate alkali glass (whose components are $B_2O_3$:20~50%, $SiO_2$:20~40%, $CaO$:15~35%, and $Na_2O$:3~15%).

To mix above-said boron-containing compounds, the first modifier, and the melting-point dropping agent to the steel slag in molten state, there are methods such as that to lay them on the bottom of the slag ladle beforehand, that to mix them together with steel slag, that to spread them on the top surface of the slag, and those of others.

In this invention, the basicity of the steel slag is so adjusted as to settle totally in the range between 1.6 and 1.9 by compensating the shortage of $SiO_2$ with silicate-containing stones and minerals and their weatherings, coal ash, and foundry waste sand which compose the first modifier, based on the chemical composition of steel slag calculated beforehand from the raw material charged in a steelmaking process or on the weight of CaO and $SiO_2$ measured by sampling from actual steel slag. By this process, the fluidity of slag is increased.

If the basicity of slag is 1.9 or less, the fluidity of steel slag in molten state increases, and the modifying reaction proceeds efficiently. The basicity of slag in this invention, however, is determined to the range between 1.6 and 1.9 because the large amount of silicate-containing minerals, etc., though decreasing the basicity and increasing the fluidity of slag if not changing the slag temperature when charged, absorbs the heat of steel slag and lower its temperature and, as a result, decreases the fluidity of slag.

Here, to be strict, the basicity of slag changes if using the compounds including CaO and $SiO_2$ as in the form of boron-containing compounds. However their amount can be ignored in calculating the chemical composition of slag because only a little amount is charged.

Then, at the time of bubbling said molten steel slag by feeding the agitating gas (air in normal operation) through a lance-like device inserted into said molten steel slag, above-said second modifier is charged into slag together with said agitating gas and, through this process, the second modifier burns and increases the slag temperature, and improves the fluidity of the slag. And, because the steel slag in molten state is stirred by the bubbling gas, the reaction between the first and second modifiers and boron-containing compounds and the steel slag is prompted, and the slag is sufficiently modified.

Moreover, if charging above-said melting-point dropping agent into the steel slag in molten state, the modification of steel slag is carried out even if the temperature of steel slag is relatively low, because it is possible to modify the steel slag, with its melting point being dropped. That is, the modification of steel slag can effectively be carried out without using a large amount of exothermic second modifier.

Here, Table 1 shows the chemical composition and the meltdown temperature of above-said first and second modifiers and melting-point dropping agent used in this invention, and Table 2 shows the above-said boron-containing compounds with their components.

TABLE 1

| Name | \multicolumn{8}{c}{Chemical composition (weight %)} | Meltdown temp. (°C.) |
|---|---|---|---|---|---|---|---|---|---|
| | $SiO_2$ | $Al_2O_3$ | $Fe_2O_3$ | CaO | MgO | $Na_2O$ | $K_2O$ | Ig. loss | |
| Sandstone | 72.1 | 14.3 | 3.0 | 0.6 | 0.5 | 3.0 | 0.8 | 2.0 | 1240 |
| Slate | 67.8 | 14.0 | 6.1 | 1.6 | 0.6 | 1.1 | 0.9 | 6.6 | 1180 |
| Volcanic ash | 68.0 | 14.5 | 3.8 | 2.2 | 0.7 | 2.3 | 0.9 | 3.0 | 1050 |
| Silica sand | 84.2 | 10.9 | 0.4 | 0.2 | 0.1 | 1.1 | 0.3 | 0.2 | 1410 |
| Soda glass | 73.0 | 2.0 | 0.6 | 5.8 | 3.4 | 14.7 | 0.5 | — | 760 |
| Coal ash | 48.4 | 22.5 | 5.7 | 8.4 | 2.5 | 1.4 | 0.0 | 9.8 | 1230 |
| Copper regulus | 26.0 | 14.9 | 46.5 | 12.8 | 2.5 | — | — | +3.0 | 1060 |
| Zinc regulus | 31.0 | 17.4 | 39.0 | 12.1 | 2.8 | — | — | +3.3 | 1050 |
| Aluminum dross | 2.3 | 80.1 | 0.7 | 0.8 | 6.5 | 3.5 | 2.3 | 3.6 | 1600 and above |
| Magnesium slag | 0.1 | 0.9 | 1.1 | 3.2 | 48.1 | 3.8 | 5.2 | 29.1 | 1600 and above |
| Obsidian | 69.0 | 12.9 | 4.4 | 0.4 | 0.2 | 2.5 | 1.8 | 9.5 | 1125 |
| Foundry waste sand | 85.9 | 3.2 | 0.3 | 2.0 | 1.0 | 1.0 | 1.1 | 5.3 | 1490 |
| Granite | 69.5 | 15.1 | 2.8 | 0.9 | 1.6 | 2.9 | 2.0 | 2.7 | 1200 |

TABLE 2

| Name | Chemical formula | Conversion to $B_2O_3$ (%) |
|---|---|---|
| Boron oxide | $B_2O_3$ | 100 |
| Boric acid | $H_3BO_3(B_2O_3.3H_2O)$ | 56.3 |
| Sodium borate | $Na_2O.2B_2O_3.10H_2O$ | 36.5 |
| Borax | $Na_2O.2B_2O_3.10H_2O$ | 36.5 |
| Kernite | $Na_2O.2B_2O_3.4H_2O$ | 51.0 |
| Colemanite | $2CaO.3B_2O_3.5H_2O$ | 50.8 |
| Ulexite | $Na_2O.2CaO.5B_2O_3.16H_2O$ | 43.0 |
| Datolite | $2CaO.B_2O_3.2SiO_2.H_2O$ | 21.8 |
| Danburite | $CaO.B_2O_3.2SiO_2$ | 28.3 |
| Borosilicate alkali glass | $B_2O_3$:31%, $SiO_2$:26%, CaO:29%, $Na_2O$:9%, $Al_2O_3$:3%, MgO:1% | |

Then, the details will be described hereinunder about the experiments carried out in order to confirm the action and effect of the method of this invention and, in addition, each raw material used in the following experiments 1 through 4 was crushed before use, the slag was separated through magnetic separating process so as to use only non-magnetic substance, and the sodium borate and boric acid anhydride of class 1 reagents were used.

EXPERIMENT 1

The raw materials were melted in 40 t electric furnace, molten steel and steel slag were discharged into a ladle and, before sending them to the next process of refining furnace, only 4000 kg of steel slag in molten state at 1550° C. was discharged into a slag ladle. Then the basicity of this steel slag was analyzed on material basis, and the basicity was 2.02. Therefore the shortage in silicate-containing minerals was compensated with 40 kg of sandstone and 100 kg of slate each of which is one of the examples of first modifier and, by this compensation, the basicity of the slag was settled to 1.82.

On the bottom of above-said slag ladle, in place of the laying slag, there were disposed a mixture consisting of 9 kg (the amount by which $B_2O_3$ in the slag becomes 0.15% by weight) of boric acid soda, the first modifier roughly crushed to 5 mm or smaller consisting of above-said sandstone and slate each of which is one of the examples of silicate-containing minerals, and 30 kg of soda glass chips which is one of the examples of melting-point dropping agent.

Then, a lance-like device was inserted into this slag ladle, and compressed air was blown into the slag to carry out bubbling. In this process, together with above-said compressed air, total 8 kg of powder mixture made of Mg and magnesium slag each of which is one of the examples of the second modifier was blown into above-said steel slag. By this treatment, said Mg and magnesium slag mixture burned and increased the slag temperature, and the molten steel slag reacted sufficiently with the first and second modifiers to complete the slag modification. This slag was cooled by air for 4 to 5 hours and crushed into proper size and sampled.

EXPERIMENT 2

The raw materials were melted in 40 t electric furnace, molten steel and steel slag were discharged into a ladle and, before sending them to the next process of refining furnace, only 4000 kg of steel slag at 1530° C. was discharged into a slag ladle. Based on chemical analysis, the basicity of this steel slag was 2.11. Therefore, to compensate the shortage in $SiO_2$ with coal ash and granite each of which is one of the examples of first modifier, 50 kg of coal ash, 120 kg of granite, and 20 kg of copper regulus which is one of the examples of melting-point dropping agent were disposed in place of the laying slag. Then, through a lance-like pipe, 8 kg (the amount by which $B_2O_3$ in the slag becomes 0.2% by weight) of boric acid anhydride and 10 kg of aluminum dross which is one of the examples of the second modifier were blown into said steel slag by use of air.

Through in this experiment, effective reaction and sufficient modification were confirmed, because above-said first and second modifiers, melting-point dropping agent, and steel slag were sufficiently stirred and, moreover, the second modifier burned, heated and increased the temperature of the steel slag if the slag temperature is lower than that described above and, in addition, the melting point of over all slag is dropped.

Moreover, it proved that the steel slag is sufficiently modified if only the basicity of the steel slag is 1.9 or less even in the case of mixing the slate which is one of the examples of silicate-containing minerals, volcanic ash which is one of the examples of silicate-containing weatherings, obsidian, and foundry waste sand, etc.

It further proved that sufficient effect of modifying reaction can be obtained even if zinc regulus is used in place of copper regulus, and if Al, Mg, and magnesium slag is used in addition to above-said aluminum dross as exothermic substance.

EXPERIMENT 3

The raw materials were melted in 40 t electric furnace and the molten steel was charged into ladle, and, after about 60-minutes continuous casting, 4000 kg of molten steel slag (corresponding to that for 3 charges) from the residue in the ladle was discharged into a slag ladle. The basicity of this molten steel slag had proved to be 2.06 through previous chemical analysis. Therefore 39 kg (the amount by which $B_2O_3$ in the slag becomes 0.3% by weight) of borosilicate alkali glass and, to compensate the shortage in $SiO_2$, 120 kg of sandstone and 60 kg of obsidian each of which is one of the examples of first modifier and 25 kg of soda glass chips which is one of the examples of melting-point dropping agent were disposed on the bottom of the ladle in place of the laying slag. Then, through a lance-like pipe, 3 kg of aluminium powder was blown into said molten steel slag by use of nitrogen gas. By this treatment, said aluminium powder burned, and the first and second modifiers reacted sufficiently with the molten steel slag to complete the slag modification. This slag was cooled by air for 4 to 5 hours and crushed into proper size and sampled.

EXPERIMENT 4

To compare with above-said experiments 1, 2, and 3, the raw materials were melted in 40 t electric furnace, molten steel and steel slag were discharged into a ladle and, before sending them to the next process of refining furnace, only 4000 kg (1.95 basicity) of steel slag approximately at 1560° C. was discharged into a slag ladle.

On the bottom of above-said slag ladle, in place of the laying slag, there were disposed a modifier consisting of the mixture of 230 kg of sandstone and 230 kg of slate each of which is one of the examples of silicate-containing minerals roughly crushed to 5 mm or smaller, and then above-said steel slag was poured into the ladle. It first seemed that a good reaction was achieved in appearance but approximately 4 to 5 hours after cooling by air while leaving the slag as it was, a large part (approximately 60%) of slag remained unreacted and, as it cooled, the slag disintegrated by dusting.

Table 3 shows the chemical composition and basicity of the modified slag produced in the examples 1 to 4 described hereinabove and the original slag hardened as it was without subjected to above-said process.

In addition, Table 4 shows the disintegration rate (by ASTM, the slag of 10 to 25 mm particle size is held at 200° C. and 20 kg/cm$^2$ for 3 hours, wherein 10 mm or under substance is regarded as disintegrated) and the minerals mainly included in the slag obtained by above-said experiments 1 through 4.

TABLE 3

| | | Chemical composition (weight %) | | | | | | Basicity |
|---|---|---|---|---|---|---|---|---|
| | | SiO$_2$ | Al$_2$O$_3$ | Fe$_2$O$_3$ | CaO | MgO | F.CaO | |
| Experiment 1 | Original slag | 23.4 | 9.1 | 0.9 | 47.3 | 8.9 | 0.1 | 2.02 |
| | Modified slag | 25.1 | 9.3 | 1.0 | 45.6 | 8.7 | 0.0 | 1.82 |
| Experiment 2 | Original slag | 22.7 | 9.8 | 1.0 | 47.9 | 9.9 | 0.1 | 2.11 |
| | Modified slag | 24.8 | 10.4 | 1.4 | 44.3 | 9.5 | 0.0 | 1.78 |
| Experiment 3 | Original slag | 23.8 | 11.2 | 0.8 | 49.1 | 9.9 | 0.1 | 2.06 |
| | Modified slag | 25.9 | 11.5 | 0.9 | 47.0 | 9.4 | 0.0 | 1.81 |
| Experiment 4 | Original slag | 24.9 | 8.9 | 0.9 | 48.7 | 8.7 | 0.0 | 1.95 |
| | Modified slag | 29.1 | 9.4 | 1.4 | 44.5 | 7.9 | 0.0 | 1.53 |

TABLE 4

| | | Disintegration rate | Major minerals included |
|---|---|---|---|
| Experiment 1 | Original slag | *100 | $\gamma$-2CaO.SiO$_2$, F.MgO |
| | Modified slag | 0.3 | $\beta$-2CaO.SiO$_2$, 2CaO.MgO.2SiO$_2$, 2CaO.Al$_2$O$_3$.SiO$_2$ |
| Experiment 2 | Original slag | *100 | $\gamma$-2CaO.SiO$_2$, F.MgO |
| | Modified slag | 0.0 | $\beta$-2CaO.SiO$_2$, 2CaO.MgO.2SiO$_2$, 2CaO.Al$_2$O$_3$.SiO$_2$ |
| Experiment 3 | Original slag | *100 | $\gamma$-2CaO.SiO$_2$, F.MgO |
| | Modified slag | 0 | $\beta$-2CaO.SiO$_2$, 2CaO.MgO.2SiO$_2$, 2CaO.Al$_2$O$_3$.SiO$_2$ |
| Experiment 4 | Original slag | *100 | $\gamma$-2CaO.SiO$_2$, F.MgO |
| | Modified slag | *100 | 2CaO.Al$_2$O$_3$.SiO$_2$, 2CaO.MgO.2SiO$_2$, CaO.MgO.2SiO$_2$ |

*Regarded as 100% without autoclaving because of disintegration due to dusting.

Moreover, from the elusion test conducted on the original and modified slags in above-said experiments 1 to 4 based on the method specified by Japanese Environment Agency, none of Cd, Pb, Cr$^{6+}$, As, CN, Cu, nor Zn was detected.

Judging from above-described results, it proved that the steel slag is sufficiently modified in the experiments 1, 2, and 3 with a small amount of first modifier which was charged by relatively large amount in conventional methods, if only a proper amount of boric acid or boron-containing compounds is charged and, the first and second modifiers are mixed to the steel slag to settle the basicity of slag in the range between 1.6 and 1.9.

Here, it is also possible to improve further the effect of modification by mixing 0.4% or more by weight of boric acid or boron-containing compounds as a conversion into B$_2$O$_3$ if they mix sufficiently with the steel slag, but the larger the charging amount is, the higher the modification cost becomes.

Then, by the addition of exothermic second modifier, the temperature of the steel slag is raised, its fluidity is increased, and the modifying reaction is prompted.

Furthermore, if the basicity of steel slag exceeds 1.9, the modification of steel slag becomes deficient and natural disintegration occurs and, if boric acid or boron-containing compounds are charged in excess so as to prompt the modifying reaction, the melting point of steel slag becomes high and the fluidity of the slag becomes poor, and then a large amount of slag remains unreacted.

Therefore, to embody the method of modifying steel slag relating to the present invention, the basicity of the steel slag to be treated is first calculated based on the supplied material or the basicity is measured by actual sampling, and the silicate-containing minerals, etc. (meaning one or two and more among silicate-containing stones and minerals and their weatherings, coal ash, and foundry waste sand) composing the first modifier are required. Then the modification of steel slag is carried out by adding above-said silicate-containing minerals, etc. after reading the compositions of SiO$_2$ and CaO from Table 1 and determining them so that the CaO/SiO$_2$ ratio in whole slag, that is, the basicity of steel slag may settle in the range between 1.6 and 1.9, and further by adding boric acid or boron-containing compounds by the amount corresponding to 0.1 to 0.4% by weight of steel slag as a conversion value into B$_2$O$_3$.

What is claimed is:

1. Method of modifying steel slag containing mainly free lime, free magnesia and dicalcium silicate, comprising:

mixing the steel slag in a molten state with boron-containing compounds capable of producing B$_2$O$_3$ in amounts corresponding to 0.1 to 0.4% by weight of said steel slag with a first modifier selected from the group consisting of silicate-containing stones and minerals and their weatherings, coal ash and foundry waste sand and mixtures thereof;

adding an exothermic second modifier selected from the group consistent of aluminum, aluminum dross, magnesium and magnesium slag and mixtures thereof to the slag; the first modifier is used in amounts so that the basicity of the steel slag, after the addition of the boron-containing compound, the first modifier and the exothermic modifier, is in the range of between above 1.6 and 1.9 and the exothermic modifier is added to the molten steel slag in powder form together with agitating gas.

2. Method of modifying steel slag set forth in claim 1 further comprising adding a melting-point dropping agent to the molten steel slag to reduce the temperature of the molten slag prior to the addition of the first modifier, the melting-point dropping agent is selected from the group consisting of soda glass chips, copper regulus, zinc regulus and mixtures thereof.

3. Method of modifying steel slag as set forth in claim 1 wherein the boron-containing compounds are selected from the group consisting boron oxide, boric acid, borax, kernite, colemanite, ulexite, and borosilicate alkali glass and mixtures thereof.

4. Method of modifying steel slag as set forth in claim 2 wherein the boron-containing compounds are selected from the group consisting boron oxide, boric acid, borax, kernite, colemanite, ulexite, and borosilicate alkali glass and mixtures thereof.

* * * * *

UNITED STATES PATENT AND TRADEMARK OFFICE
CERTIFICATE OF CORRECTION

PATENT NO. : 5,019,160

DATED : May 28, 1991

INVENTOR(S) : Mitsuhisa HARADA et al

It is certified that error appears in the above-identified patent and that said Letters Patent is hereby corrected as shown below:

On the Title Page, Item [63], "Sep. 30, 1989" should read -- Aug. 30, 1989 --.

Signed and Sealed this

Twenty-second Day of December, 1992

Attest:

DOUGLAS B. COMER

*Attesting Officer*   *Acting Commissioner of Patents and Trademarks*